US005728781A

United States Patent [19]
Usuki et al.

[11] Patent Number: 5,728,781
[45] Date of Patent: Mar. 17, 1998

[54] POLYMER SCALE DEPOSTION PREVENTIVE AGENT AND A PROCESS FOR PRODUCING POLYMERS USING THE SAME

[75] Inventors: Masahiro Usuki, Annaka; Toshihide Shimizu, Urayasu, both of Japan

[73] Assignee: Shin-Etsu Chemical Co., Ltd., Tokyo, Japan

[21] Appl. No.: 704,865

[22] Filed: Aug. 30, 1996

[30] Foreign Application Priority Data

Sep. 1, 1995 [JP] Japan ................. 7-248638

[51] Int. Cl.$^6$ ........................................ C08F 14/06
[52] U.S. Cl. ........................................ 526/62
[58] Field of Search ................................ 526/62

[56] References Cited

FOREIGN PATENT DOCUMENTS

| 0 123 654 | 10/1984 | European Pat. Off. |
| 0 635 520 | 1/1995 | European Pat. Off. |
| 635520 | 1/1995 | European Pat. Off. |

OTHER PUBLICATIONS

Chemical Abstracts, Abs. 103:89 034, JP-A-60 101 155, Jun. 1985.

Chemical Abstracts, Abs. 99:23 127, JP-A-58 011 504, Jan. 22, 1983.

Primary Examiner—Thomas R. Weber
Attorney, Agent, or Firm—Oblon, Spivak, McClelland, Maier, & Nuestadt, P.C.

[57] ABSTRACT

A polymer scale deposition preventive agent comprising (a) an aromatic compound having at least eight conjugated $\pi$ bonds and having a molecular weight of 1,000 or more, and (b) a polyalkylene oxide having a weight-average molecular weight of 2,000 or more, wherein the weight ratio of the component (a) to the component (b) is 100/500 to 100/1, can prevent surely the deposition of polymer scale even in a polymerization system containing a monomer, such as styrene, acrylic acid esters or acrylonitrile, which has a high solvency for a coating film consisting of the conventional polymer scale deposition preventive agent.

14 Claims, No Drawings

1

POLYMER SCALE DEPOSTION PREVENTIVE AGENT AND A PROCESS FOR PRODUCING POLYMERS USING THE SAME

BACKGROUND OF THE INVENTION

1. Field of the Invention

The present invention relates to a preventive agent for preventing polymer scale deposition in producing a polymer by polymerizing a monomer having an ethylenically unsaturated double bond, and a process for producing the polymer using said agent.

2. Description of the Prior Art

It is known that upon polymerizing a monomer having an ethylenically unsaturated double bond such as vinyl chloride in a polymerization vessel, the resulting polymer is deposited as a scale on the inner wall surface, and the like, of the polymerization vessel. The polymer scale is remarkably deposited with the number of repeated polymerization batches, and it causes problems including a reduction in the cooling capacity of the polymerization vessel and a decrease in the yield of a polymer. Further, there occurs the problem that the polymer scale released from the inner wall surface is mixed into the resulting polymer to degrade the quality of the product. Furthermore, it requires a great deal of labor and time to remove the polymer scale. Also, there is a problem in that the polymer scale contains unreacted monomers and therefore, upon leaving them to stand, the operators will be physically affected.

In order to prevent polymer scale deposition in polymerizing a monomer having an ethylenically unsaturated double bond, there have hitherto been known methods for forming a coating film by coating a polymer scale deposition preventive agent on the inner wall surface, and the like, of a polymerization vessel. Examples of the polymer scale deposition preventive agent include dyes or pigments (Japanese Patent Publication (Kokoku) No. 45-30835), aromatic amine compounds (Japanese Pre-examination Patent Publication (Kokai) 51-50887), a reaction product of a phenol compound and an aromatic aldehyde compound (Japanese Patent Publication (Kokoku) No. 2-363), self-condensed polyhydric phenols (Japanese Pre-examination Patent Publication (Kokai) 54-7487) and a reaction product of 1-naphthol and formaldehyde (Japanese pre-examination Patent Publication (kokai) 57-1641).

A process for preventing polymer scale deposition using these substances is effective in the case where a monomer having an ethylenically double bond to be used in polymerization is vinyl chloride monomer. However, it is difficult to effectively prevent polymer scale deposition in the case where said monomer is styrene, α-methylstyrene, acrylic acid esters, acrylonitrile, vinyl acetate or the like. This is because these monomers have a high solvency power for a coating film consisting of the polymer scale deposition preventive agent as mentioned above. Especially when the concentration of said monomer is high or when even if the concentration is low, it requires a long time for polymerization, polymer scale tends to be deposited.

SUMMARY OF THE INVENTION

Accordingly, a task of the present invention relates to a novel polymer scale deposition preventive agent and is to provide a preventive agent capable of effectively preventing polymer scale deposition not only in polymerizing vinyl chloride but also in polymerizing the other monomer having an ethylenically unsaturated double bond, which has a high solvency power, such as α-methylstyrene; and to a process for producing a polymer using said agent.

The present inventors have found that in order to solve said task, it was effective to use a polymer scale deposition preventive agent for the polymerization of a monomer having an ethylenically unsaturated double bond, said agent comprising (a) an aromatic compound having at least eight conjugated π bonds and having a molecular weight of 1,000 or more, and (b) a polyalkylene oxide having a weight-average molecular weight of 2,000 or more, the weight ratio of the component (a) to the component (b) being 100/500 to 100/1.

Also, the present invention provides a process for producing a polymer comprising the step of polymerizing a monomer having an ethylenically unsaturated double bond in a polymerization vessel having a coating film on the inner wall surface thereof, wherein said coating film consists of the aforementioned polymer scale deposition preventive agent.

According to the present invention, polymer scale can be effectively prevented from being deposited on areas, with which the monomer having an ethylenically unsaturated double bond is brought into contact, such as the inner wall surface of a polymerization vessel and a stirrer. Especially even when polymerizing a monomer, which could hardly prevent polymer scale deposition since the monomer had a high solvency for a coating film consisting of the conventional polymer scale deposition preventive agent, such as styrene, acrylic acid esters or acrylonitrile, the deposition of scale can be effectively prevented.

DESCRIPTION OF THE PREFERRED EMBODIMENTS

[Polymer Scale Deposition Preventive Agent]

Component (a)

The polymer scale deposition preventive agent according to the present invention should contain an aromatic compound having at least eight conjugated π bonds and having a molecular weight of 1,000 or more (hereinafter, said compound being referred to as conjugated π bond compound). The "π bond" means a double bond and a triple bond in this specification and includes, for example, C=C, C=C, N=N, C=N and C=O. The "conjugated π bond" means π bonds having a conjugated relation of one π bond with the other π bond adjacent thereto each other. Among such conjugated π bond compounds, more preferred is a compound having at least five π bonds, which are in conjugated relation, in a row. Further, the molecular weight of the conjugated π bond compound is measured by gel permeation chromatography (GPC). Preferably, the conjugated π bond compound has 8 or more conjugated π bonds and a molecular weight of 1,500 or more.

The conjugated π bond compounds are exemplified in the following.

1) Reaction products having a molecular weight of 1,000 or more among reaction products obtained by subjecting dihydroxybiphenyls and aldehydes to condensation reaction in the presence of an acid catalyst as described in Japanese Patent Publication (Kokoku) No. 6-62709:

Examples of the dihydroxybiphenyls include 2,2'-dihydroxybiphenyl, 2,2'-dihydroxy-5,5'-dimethylbiphenyl, 2,2'-dihydroxy-4,4',5,5'-tetramethylbiphenyl, 2,2'-dihydroxy-5,5'-dichlorobiphenyl, 2,2'-dihydroxy-5,5'-dicyclohexylbiphenyl and 2,2'-dihydroxy-5,5'-di-tert-butylbiphenyl. Among them, industrially preferred is 2,2'-dihydroxybiphenyl.

The aldehydes include, for example, formaldehyde, acetaldehyde, propionaldehyde, butylaldehyde, acrolein, crotonaldehyde, benzaldehyde, furfural, phenylacetaldehyde, 3-phenylpropionaldehyde and 2-phenylpropionaldehyde. Among them, formaldehyde and acetaldehyde are industrially and economically advantageous.

The dihydroxybiphenyls and the aldehydes are reacted in the presence of an acid catalyst to form reaction products. Preferable catalysts in the reaction are strongly acidic ones, for example, sulfuric acid, hydrochloric acid, perchloric acid, p-toluenesulfonic acid, methanesulfonic acid and trifluoromethanesulfonic acid, and more preferably hydrochloric acid and p-toluenesulfonic acid.

Among the reaction products of the dihydroxybipheyls and the aldehydes, more preferable reaction products are obtained in the case where the molar ratio of the aldehydes to the dihydroxybiphenyls is not larger than 1.0. Preferable molar range of the aldehydes per mole of the dihydroxybiphenyls is 0.5 to 1.0 mole , and more preferably 0.6 to 0.9 mole.

The reaction of the dihydroxybiphenyls and the aldehydes is advantageously effected at a reaction temperature ranging from 50° to 200° C. for a reaction time ranging from 5 to 30 hours, and more preferably effected at 100° to 150° C. In some cases, it may be desirable that a solvent generally used is present in this reaction. Examples of preferable solvents include aromatic hydrocarbons such as benzene, toluene and xylene; halogenated hydrocarbons such as dichloroethane, trichloroethane and monochlorobenzene; ethers such as butyl methyl ether, ethylene glycol dimethyl ether and dimethyl ether; and ketones such as methyl ethyl ketone and methyl isobutyl ketone. However, examples of the solvent are not limited thereto.

2) Condensation products having a molecular weight of 1,000 or more among condensation products obtained by subjecting 1-naphthols and formaldehyde to condensation reaction in the presence of a catalyst as described in Japanese Pre-examination Patent Publication (Kokai) No. 57-164107:

1-naphthols are selected from compounds represented by the following formula:

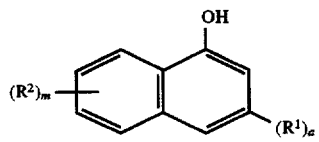

wherein a is 0 or 1; m is 0, 1, 2 or 3 (preferably 0, 1 or 2); and $R^1$ and $R^2$ may be the same or different and are selected from among halogen atoms (preferably Cl), hydrocarbyl groups (preferably an alkyl group having 1 to 5 carbon atoms), hydroxy and hydrocabyloxy groups (preferably an alkoxyl group having 1 to 5 carbon atoms); and the case where a or m is 0 means having no substituent.

Examples of 1-naphthols include 1-naphthol per se, 1,3-dihydroxynaphthalene, 1,5-dihydroxynaphthalene and 1,7-dihydroxynaphthalene.

Mediums for effecting said condensation reaction include, for example, water; and organic solvents, for example, alcohols such as methanol, ethanol and propanol; ketones such as acetone and methyl ethyl ketone; and esters such as methyl acetate and ethyl acetate.

The catalysts used include acid catalysts such as hydrochloric acid; and basic catalysts such as NaOH, KOH and $NH_4OH$. They are added in an amount of 0.5 to 0.9 mole per mole of 1-naphthols. The proportion of 1-naphthols to formaldehyde when conducting the condensation reaction is affected by the kind of each of 1-naphthol and solvent used, reaction temperature, reaction time, etc. Generally, the amount of formaldehyde is preferably 0.2 to 10 moles, and more preferably 0.5 to 5 moles, per mole of 1-naphthols. The condensation reaction may be effected by reacting 1-naphthols and formaldehyde in a suitable medium in the presence of a catalyst generally at 50° to 200° C. for 1 to 30 hours, and preferably at 70° to 150° C. for 3 to 10 hours. The medium includes, for example, water; and alcohols such as methanol, ethanol and propanol.

3) Condensates having a molecular weight of 1,000 or more among condensates of phenol compounds with formaldehyde or benzaldehyde as described in Japanese Patent Publication (Kokoku) No. 2-363 and Japanese Pre-examination Patent Publication (Kokai) 57-192413:

Suitable phenol compounds include pyrogallol, hydroxyhydroquinone, hydroxybenzoic acid, salicylic acid and mixtures thereof.

The above condensates of phenol compounds with formaldehyde or benzaldehyde is prepared by reacting these reactant components in a suitable medium in the presence of a catalyst generally at room temperature (for example 20° C.) to 200° C. for 2 to 100 hours, and preferably at 30° to 150° C. for 3 to 30 hours.

Mediums for effecting said condensation reaction include, for example, water; and organic solvents, for example, alcohols such as methanol, ethanol and propanol; ketones such as acetone and methyl ethyl ketone; and esters such as methyl acetate and ethyl acetate.

The pH of a medium for effecting said condensation reaction is generally in the range of 1 to 13, and pH adjusters can be used without particularly being restricted.

The proportion of the phenol compound to formaldehyde or benzaldehyde when conducting the condensation reaction is affected by the kind of each of the phenol compound and formaldehyde or benzaldehyde and solvent used, reaction temperature, reaction time, etc. Generally, the amount of formaldehyde or benzaldehyde is preferably 0.5 to 10 parts by weight, and more preferably 0.1 to 5 parts by weight, per part by weight of the phenol compound.

4) Polyaromatic amines having a molecular weight of 1,000 or more among polyaromatic amines as described in Japanese Patent Publication (Kokoku) No. 59-16561:

The polyaromatic amines are obtained by subjecting either one of the following compounds (a) to (d), or two or more thereof together to condensation reaction.

(a) Polyaminobenzene represented by the formula:

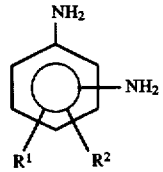

wherein $R^1$ add $R^2$ are —H, halogen, —$NH_2$, —OH or an alkyl group having 1 to 8 carbon atoms and may be the same or different, for example, o-, m- or p-phenylenediamine; diaminotoluene, diaminoxylene, diaminophenol, triaminobenzene, triaminotoluene and triaminoxylene; ethyl, propyl, butyl or pentyldi- or triaminobenzene. The most suitable compound is a compound where $R^1$ is —H, and $R^2$ is —H, a methyl group or an ethyl group.

(b) Polyhydric phenol represented by the formula:

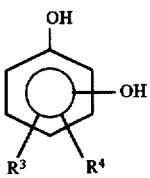

wherein $R^3$ and $R^4$ are —H, halogen, —NH$_2$, —OH or an alkyl group having 1 to 8 carbon atoms and may be the same or different, for example, catechol, resorcinol, chlororesorcinol, hydroquinone, phloroglucinol and pyrogallol; dihydroxytoluene and dihydroxyxylene; trihydroxytoluene and trihydroxyxylene; ethyl, propyl, butyl or pentyldi- or trihydroxybenzene. The most suitable compound is a compound where $R^3$ is —H, and $R^4$ is —H or —OH.

(c) Aminophenol; alkyl-substituted aminophenol; and the other compound represented by the formula:

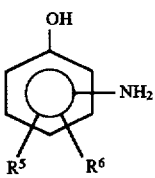

wherein $R^5$ and $R^6$ are —H, halogen, —NH$_2$, —OH or an alkyl group having 1 to 8 carbon atoms and may be the same or different, for example, o-, m- or p-aminophenol; diamino- or triamino-phenol; methyl, ethyl, propyl, butyl or pentylamino- or diaminophenol. The most suitable compound is a compound where $R^5$ is —H, and $R^6$ is —H or —NH$_2$.

(d) Diphenylamine, alkyl-substituted diphenylamine and the other compound represented by the formula:

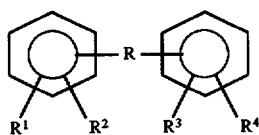

wherein R is a group represented by the following formula:

or a straight chain or branched chain alkyl group having 1 to 5 carbon atoms, and $R^1$, $R^2$, $R^3$ and $R^4$ are each —H, —NH$_2$, —OH, halogen or an alkyl group having 1 to 8 carbon atoms and at least two thereof are one selected from —NH$_2$, —OH and their combination, for example, bisphenol A. The most suitable compound of said other compounds is a compound where $R^1$ and $R^4$ are —OH or —NH$_2$, and $R^2$ and $R^3$ are —H.

The halogen in said formula may be chlorine, bromine, iodine or fluorine. When reacting two or more of said compounds together in accordance with the condensation reaction, at least one compound should have an amino group and in case where more than two compounds are contained in the reaction system, it is preferable that at least two compounds among them have an amino group. For example, useful polyaromatic amines are one formed by condensing m-phenylenediamine, resorcinol and p-aminophenol together, and one formed by condensing m-phenylenediamine, resorcinol, phloroglucinol and m-aminophenol together.

Particularly useful polyaromatic amines are one obtained when reacting the aromatic diamine and the polyhydric phenol together. Generally, these compounds are reacted together at a substantially equal molar ratio. However, either the diamine or the phenol can be also used in an excess amount.

As aforementioned, when any of said compounds is subjected to self-condensation or to reaction with one or more of the other compounds, an acid catalyst is used. For example, HCl, methanesulfonic acid, benzenesulfonic acid, sulfanilic acid, phosphoric acid, iodine, benzendisulfonic acid, hydrogen bromide (HBr), hydrogen iodide (HI) and aluminum chloride can be used. The concentration of the catalyst will be varied depending upon the specified catalyst used. However, it is desirable that when the compound is subjected to self-condensation, the concentration of the catalyst is about 0.005 to about 0.20 moles per mole of said compound, and that when one or more compounds are subjected to reaction, said concentration is the same as above per mole of the amino compound.

The reaction temperature of the compound subjected to reaction singly or in combination with the other compound will be varied depending upon the reaction temperature and the molecular weight of the desired final product. For example, it is possible that the reactant components are rapidly heated to 315° C. and then maintained at this temperature for various hours. It is also possible that the reactant components are heated to various temperatures more than 300° C., followed by immediately cooling. When using the latter method, the reaction time is given as 0 hour. Thus, the reaction temperature will be varied from about 250° to about 360° C., and the reaction time will be varied from about 0 to about 3 hours. Preferable reaction temperature range is 275° to 330° C., and the reaction time is 0 to 1 hour.

5) Condensation products having a molecular weight of 1,000 or more among condensation products selected from the group consisting of self-condensation products of polyhydric phenols and self-condensation products of polyhydric naphthols as described in Japanese Pre-examination Patent Publication (Kokai) No. 54-7487:

The self-condensation products of polyhydric phenols are prepared by heating one or more selected from resorcinol, hydroquinone, catechol and phloroglucinol in the absence of a catalyst or in the presence of a suitable catalyst. The same is applied to the self-condensation products of polyhydric naphthols, for example, the self-condensation product of 2,7-dihydroxynaphthalene, 3,7-dihydroxynaphthalene or 2,6-dihydroxynaphthalene. Polyhydric phenol or polyhydric naphthol is heated in an inert atmosphere such as nitrogen and argon at a temperature ranging from 200° to 350° C. for 4 t 20 hours. In this reaction, various catalysts such as zinc chloride, aluminum chloride and sodium hydroxide can be used. The concentration of the catalyst used is sufficiently about 0.05 to 0.50 mole per mole of one or more of the compounds to be condensed.

6) Reaction products having a molecular weight of 1,000 or more among reaction products of ketone resins and phenolic compounds and further, if necessary, aldehyde compounds as described in Japanese Pre-examination Patent Publication (Kokai) No. 62-236804:

The ketone resins to be used are resins obtained by generally condensing ketones and aldehydes and are a solid substance at normal temperature having a softening point of 80° to 130° C. They are resins prepared particularly using cyclohexanone or acetophenone as ketones, a starting material, and formaldehyde.

The phenolic compounds are an aromatic compound having one or more phenolic OH groups and include, for example, monohydric phenols such as phenol and cresol; dihydric phenols such as resorcin, catechol, hydroquinone and bisphenol A; trihydric phenols such as pyrogallol and hydroxyhydroquinone; or those having a substituent such as an alkyl group or a carboxylic group in said compounds.

The aldehyde compounds include, for example, aliphatic aldehydes such as formaldehyde, paraformaldehyde and acetaldehyde; and aromatic aldehydes such as typically benzaldehyde.

As a method for preparing the condensation products of the ketone resin and the phenolic compound, the ketone resin and the phenolic compound are reacted in the presence of a Friedel-Crafts type catalyst or an acid catalyst in nitrogen atmosphere at 50° to 250° C., and preferably 100° to 200° C., for 1 to 10 hours to prepare the condensation product. If desired, an aldehyde compound may be added and reacted thereto. In this case, methods for adding and reacting the aldehyde compound include (1) a method comprising simultaneously reacting the ketone resin, the phenolic compound and the aldehyde compound; (2) a method comprising reacting the ketone resin and the phenolic compound, and thereafter adding and reacting the aldehyde compound thereto; and (3) a method comprising reacting the phenolic compound and the aldehyde compound, and thereafter reacting the ketone resin.

As Friedel-Crafts type catalysts or acid catalysts, there can be used generally halides such as aluminum chloride, boron fluoride, zinc chloride and iron chloride; complex compounds of the halides; inorganic acids such as hydrochloric acid and sulfuric acid; or organic acids such as p-toluenesulfonic acid.

With regard to the amount of the ketone resin and the phenolic compound, the ketone resin is used in an amount of 5 to 200 parts by weight, and preferably 30 to 150 parts by weight, based on 100 parts by weight of the phenolic compound. Further, the aldehyde compound is used in an amount of 0 to 2 moles, and preferably 0.5 to 1.5 mole, per mole of phenolic compounds.

The catalyst is used in an amount of 0.01 to 30 parts by weight, and preferably 0.1 to 20 parts by weight, based on 100 parts by weight of the phenolic compound. If the amount of the catalyst is smaller than said range, reactivity lowers, while if the amount is larger, solubility in a solvent or an alkali solution lowers.

Mediums for effecting said condensation reaction include, for example, water; and organic solvents, for example, alcohols such as methanol, ethanol and propanol; ketones such as acetone and methyl ethyl ketone; and esters such as methyl acetate and ethyl acetate.

The pH of a medium for effecting said condensation reaction is generally in the range of 1 to 13, and pH adjusters can be used without particularly limiting.

7) Condensates having a molecular weight of 1,000 or more among condensates of phenothiazine and formaldehyde as described in Japanese Pre-examination Patent Publication (Kokai) No. 2-500845:

In the reaction of phenothiazine and formaldehyde, the molar ratio of formaldehyde to phenothiazine is generally about 0.1 to less than 1, and preferably about 0.4 to less than 1. As a reaction solvent, there can be used, for example, nonpolar solvents such as tetrahydrofuran (THF), dimethylformamide (DMF), cyclohexanone and dimethylsulfoxide (DMSO).

As a reaction catalyst, there can be used either acidic or alkaline compounds. However, preferred are acidic compounds, and particularly preferred are strong acids. Preferable compounds include hydrocholoric acid, sulfuric acid, nitric acid and phosphoric acid. Suitable caustic alkaline compounds include sodium hydroxide and the other alkali metal hydroxides.

The reaction temperature is preferably room temperature (for example, 20° C.) to the reflux temperature of a solvent having the lowest boiling point, and more preferably about 60° to 80° C.

8) Condensates having a molecular weight of 1,000 or more and basified products having a molecular weight of 1,000 or more among condensates of aromatic amines and aromatic nitro compounds, and basified products thereof, as described in Japanese Pre-examination Patent Publication (Kokai) No. 60-30681:

There can be enumerated (1) condensates obtained by reacting the aromatic amines and the aromatic nitro compounds in the presence of a condensation catalyst at a temperature ranging from 100° to 250° C., and (2) products obtained by basifying said condensates with an alkali metal salt or an ammonium compound.

There can be enumerated condensates obtained by reacting the aromatic amine compounds and the aromatic nitro compounds in the presence of a mineral acid and a condensation catalyst, and/or products obtained by basifying condensates with an alkali metal salt, such as NaOH, Na$_2$CO$_3$ and KOH, or an ammonium compound, such as NH$_4$OH and (NH$_4$)$_2$CO$_3$. The "condensates" have no strict sense of the word. Of course, the condensates include also intermediates produced during a process of obtaining the final condensates.

The aromatic amine compounds used herein are compounds represented by the following general formula:

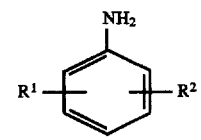

wherein R$^1$ represents —H, —NH$_2$, —Cl, —N=N—C$_6$H$_5$, —OH, —COCH$_3$, —OCH$_3$, —NH—C$_6$H$_5$, —NH—C$_6$H$_4$—NH$_2$, —NH—C$_6$H$_4$—OCH$_3$, —N(CH$_3$)$_2$, —NH—C$_6$H$_4$—OH, —NH—CO—CH$_3$ or an alkyl group having 1 to 3 carbon atoms, and R$^2$ represents —H, —NH$_2$, —OH or —CH$_3$.

Such aromatic amine compounds are exemplified by aniline, o-, m-, or p-phenylenediamine, o-, m- or p-aminophenol, o-, m- or p-chloroaniline, p-aminoazobenzene, 2,4-diaminoazobenzene, p-aminoacetanilide, o-, m- or p-methylaniline, 4-aminodiphenylamine, 2-aminodiphenylamine, 4,4-diaminodiphenylamine, N,N-dimethyl-p-phenylenediamine, 4-amino-3'-methoxydiphenylamine, 4-amino-4'-hydroxydiphenylamine, 4-chloro-o-phenylenediamine, 4-methoxy-o-phenylenediamine, 2-amino-4-chlorophenol and 2,3-diaminotoluene.

The aromatic nitro compounds to be subjected to condensation reaction with the aromatic amine compounds are compounds represented by the following general formula:

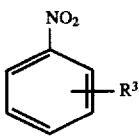

wherein R³ represents —H, —OH, —OCH₃, —OC₂H₅, —Cl, —NH₂, —COOH or —SO₃H.

Such aromatic nitro compounds are exemplified by nitrobenzene, o-, m- or p-hydroxynitrobenzene, o-, m- or p-nitroanisole, o-, m- or p-nitrophenetole, o-, m- or p-chloronitrobenzene, o-, m- or p-aminonitrobenzene, o-, m- or p-nitrobenzoic acid, o-, m- or p-nitrobenzenesulfonic acid, o-, m- or p-nitroaniline, 2-nitro-p-phenylenediamine, 2-amino-4-nitrophenol, 2-amino-5-nitrophenol and 4-amino-2-nitrophenol.

In order to subject said aromatic amine compounds and said aromatic nitro compounds to condensation reaction, a mineral acid and a condensation catalyst are used. The mineral acids are exemplified by hydrochloric acid, nitric acid, hydrobromic acid, phosphoric acid and sulfuric acid.

Suitable condensation catalysts are exemplified by permanganic acid and its salts, such as permanganic acid and potassium permanganate; chromic acid-related compounds such as chromium trioxide, potassium perchromate and sodium chlorochromate; metal salts of nitric acid, such as silver nitrate and lead nitrate; halogens such as iodine and bromine; peroxides such as hydrogen peroxide, sodium peroxide, benzoyl peroxide, potassium persulfate, ammonium persulfate, peracetic acid, cumene hydroperoxide, perbenzoic acid and p-menthane hydroperoxide; oxyacids and their salts, such as iodic acid, potassium iodate and sodium chlorate; metal salts such as ferrous chloride, ferric chloride, copper sulfate, cuprous chloride, cupric chloride and lead acetate; and ozone and oxides such as cupric oxide, mercury oxide, cerium oxide, manganese dioxide and osmic acid. Further, it is also effective to use hydrogen peroxide in combination with ferrous chloride.

The condensation catalysts to be used include oxidation catalysts such as heavy metal salts, peroxides or halogen and its oxyacids.

The condensates are obtained by heating at least one aromatic amine compound and at least one aromatic nitro compound in the presence of said mineral acid and condensation catalyst at 100° to 250° C. for 10 to 30 hours. The final products are affected by the kind of each of the aromatic amine compound, aromatic nitro compound, condensation catalyst and mineral acid; composition ratio; reaction temperature; and reaction time. With regard to the mixing ratio, the amount of the aromatic nitro compound is 0.10 to 0.50 mole per mole of the aromatic amine compound. If it is smaller than the lower limit of the range, the polymer scale preventive effect lowers in an oil-soluble polymerization catalyst system. If it is larger than the upper limit, the aromatic nitro compound remains in the final product to lower the polymer scale preventive effect. The amount of the condensation catalyst per mole of the aromatic amine compound is preferably 0.03 to 0.50 mole, and similarly the amount of the mineral acid is preferably 0.20 to 0.50 mole.

The products obtained by basifying said condensates with an alkali or an ammonium compound, such as NaOH, KOH, Na₂CO₃, NH₄OH and (NH₄)₂CO₃, are also suitably used. Such basification methods include, for example, a method comprising dispersing 100 parts by weight of the subject condensate in water, adding 10 to 20 parts by weight of an alkali or an ammonium compound thereto, and heat-treating the resulting mixture at 90° to 140° C. The amount of an alkali or an ammonium compound may be an amount sufficient to neutralize the mineral acid used when condensing.

The basified products are soluble in toluene and besides chlorinated hydrocarbons such as methylene chloride, trichloroethylene and perchloroethylene. Since these chlorinated hydrocarbons are nonflammable, it is advantageous in that a coating liquid using a nonflammable solvent is obtained.

9) Condensates having a molecular weight of 1,000 or more among condensates of pyrogallol and acetone as described in Japanese Pre-examination Patent Publication (Kokai) No. 4-328104:

A pyrogallol-acetone resin used is a condensation polymer of pyrogallol with acetone. In the condensate, the molar ratio of pyrogallol/acetone is generally in the range of 1/0.1 to 1/10 and the melting point is generally in the range of 100° to 500° C. The larger the molecular weight, the higher the melting point. For example, the resin having a melting point of 160° to 170° C. corresponds one having a molecular weight of 1,450 to 1,650, and the resin having a melting point of 200° to 220° C. one having a molecular weight of 2,600 to 4,000.

The pyrogallol-acetone resin is prepared by dissolving pyrogallol in acetone and condensing the resulting solution in the presence of a condensation catalyst. In this case, pyrogallol is used generally in an amount of 1 to 100 parts by weight per 100 parts by weight of acetone. The condensation catalysts used include, for example, phosphorus oxychloride. The reaction may be effected at room temperature (for example, 20° C.). The pyrogallol-acetone resin can be also commercially available under the tradename of Pyrogallol-acetone resin (produced by Fuji Kagaku Kogyo K.K.) for use.

10) Condensates having a molecular weight of 1,000 or more among condensates of aromatic amine compounds, quinone compounds and aromatic hydroxy compounds, as described in Japanese Pre-examination Patent Publication (Kokai) No. 5-112603:

The condensation product is a substance obtained by condensing (A) an aromatic amine compound, (B) a quinone compound, and (C) an aromatic hydroxy compound. The aromatic amine compound (A) includes, for example, compounds represented by the following general formulae (1) to (3).

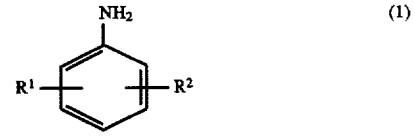

(1)

wherein R¹ represents —H, —NH₂, —Cl, —OH, —NO₂, —COCH₃, —OCH₃, —N(CH₃)₂ or an alkyl group having 1 to 3 carbon atoms, and R² represents —H, —NH₂, —OH, —CH₃, —COOH or —SO₃H.

Specifically, there are exemplified aniline, o-, m-, or p-phenylenediamine, o-, m- or p-aminophenol, o-, m-, or p-chloroaniline, o-, m- or p-nitroaniline, o-, m- or p-methylaniline, N,N-dimethyl-p-phenylenediamine, 4-chloro-o-phenylenediamine, 4-methoxy-o-phenylenediamine, 2-amino-4-chlorophenol, 2,3-diaminotoluene, 5-nitro-2-aminophenol, 2-nitro-4-aminophenol, 4-amino-2-aminophenol and o-, m- or p-aminosalicylic acid.

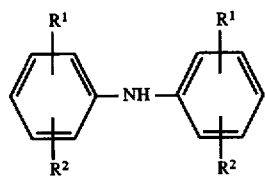

(2)

wherein two $R^1$ may be the same or different and are as defined above, and two $R^2$ may be the same or different and are as defined above.

Specifically, there are exemplified diphenylamines such as 4-aminodiphenylamine, 2-aminodiphenylamine, 4,4'-diaminodiphenylamine, 4-amino-3'-methoxydiphenylamine and 4-amino-4'-hydroxydiphenylamine.

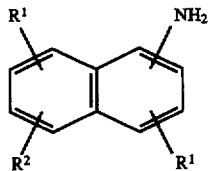

(3)

wherein two $R^1$ may be the same or different and are defined above, and two $R^2$ is also as defined above.

Specifically, there are exemplified α-naphthylamine, β-naphthylamine, 1,5-diaminonaphthalene, 1-amino-5-hydroxynaphthalene, 1,8-diaminonaphthalene and 2,3-diaminonaphthalene.

The quinone compounds include, for example, benzoquinones and their derivatives, such as o-, m- or p-benzoquinone, tolu-p-quinone, o-xylo-p-quinone, thymoquinone, 2-methoxybenzoquinone, gentisylquinone, and polyporic acid; naphthoquinones and their derivatives, such as 6-methyl-1,4-naphthoquinone, 2-methyl-1,4-naphthoquinone, naphthoquinone, juglone, lawsone, plumbagin, alkannin, echinochrome A, vitamin $K_1$, vitamin $K_2$, shikonin, β,β'-dimethylacrylshikonin, β-hydroxyisovalerylshikonin, teracrylshikonin; anthraquinones and their derivatives, such as tectoquinone, 3-hydroxy-2-methylanthraquinone, anthraquinone, 2-hydroxyanthraquinone, alizarin, xanthopurpurin, rubiadin, munjistin, crythophanic acid, carminic acid, kermesic acid and laccaic acid A; and phenanthrenequinones such as phenenthrenequinone. Among them, particularly preferred are benzoquinones.

The aromatic hydroxy compound (C) includes, for example, compounds represented by the following general formulae (4) and (5).

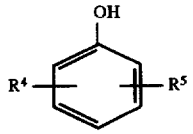

(4)

wherein $R^4$ represents —H, —Cl, —OH, —COCH$_3$, —OCH$_3$, —COOH, —SO$_3$H or an alkyl group having 1 to 3 carbon atoms, and $R^5$ represents —H, —Cl, —OH, —OCH$_3$, —OC$_2$H$_5$ or —COOH.

Specifically, there are exemplified phenol derivatives such as phenol, hydroquinone, resorcinol, catechol, hydroxyhydroquinone, pyrogallol, o-, m- or p-chlorophenol, o-, m- or p-hydroxybenzoic acid, 2,4-dihydroxybenzoic acid, 2,5-dihydroxybenzoic acid, 2,6-dihydroxybenzoic acid, 3,4-dihydroxybenzoic acid, 3,5-dihydroxybenzoic acid and (2,5-, 2,6- or 3,5-)dihydroxytoluene.

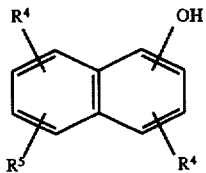

(5)

wherein $R^4$ and $R^5$ are as defined above.

Specifically, there are exemplified naphthol derivatives such as α-naphthol, β-naphthol, (1,3-, 1,4-, 1,5-, 2,3-, 2,6- or 2,7-)dihydroxynaphthalene, 1-hydroxy-2-naphthoic acid and 3-hydroxy-2-naphthoic acid.

The condensation of the aromatic amine compound (A), the quinone compound (B) and the aromatic hydroxy compound (C) is effected in an organic solvent medium and, if necessary, in the presence of a condensation catalyst. The pH of the organic solvent medium is in the range of 1 to 13, and preferably 4 to 10. pH adjusters can be used without particularly being restricted. pH adjusters used for acidifying include, for example, phosphoric acid, sulfuric acid, phitic acid and acetic acid, and pH adjusters used for alkalizing include, for example, alkali metal compounds or ammonium compounds, such as LiOH, KOH, NaOH, Na$_2$CO$_3$, Na$_2$SiO$_3$, Na$_2$HPO$_4$ and NH$_4$OH; and organic amine compounds such as ethylenediamine, monoethanolamine and triethanolamine.

Preferable mediums for the condensation reaction include an organic solvent such as alcohols, ketones and esters; and a mixed solvent of water and an organic solvent miscible with water. As the organic solvents miscible with water, there can be used, for example, alcohols such as methanol, ethanol and propanol; ketones such as acetone and methyl ethyl ketone; and esters such as methyl acetate and ethyl acetate.

The condensation catalysts to be used optionally are exemplified by azo catalysts such as α,α'-azobisisobutylonitrile, α,α'-azobis-2,4-dimethylvaleronitrile; simple substance halogens in the form of a molecule or element, such as iodine, bromine and chlorine; peroxides such as hydrogen peroxide, sodium peroxide, benzoyl peroxide, potassium persulfate, ammonium persulfate, peracetic acid, cumene hydroperoxide, perbenzoic acid and p-menthane hydroperoxide; oxyacids and their salts, such as iodic acid, periodic acid, potassium periodate, sodium perchlorate. Incidentally, since the quinone compounds act as a condensation catalyst, the condensation reaction proceeds even without using the condensation catalyst.

The condensation products are obtained by reacting at least one aromatic amine compound (A), at least one quinone compound (B) and at least one aromatic hydroxy compound (C) in the presence of said organic solvent medium and, if necessary, the condensation catalyst at room temperature to 200° C. for 0.5 to 100 hours. The condensation products are affected by the kind of each of the aromatic amine compound, quinone compound and aromatic hydroxy compound; composition ratio; reaction temperature; and reaction time. In the present invention, the amount of the quinone compound (B) is preferably 0.03 to 1.0 mole per mole of the aromatic amine compound (A).

11) Condensates having a molecular weight of 1,000 or more among condensates of aromatic amine compounds (A) and quinone compounds (B) as described in Japanese Pre-examination Patent Publication (Kokai) No. 6-56911:

The aromatic amine compounds (A) are classified into an aromatic amine compound (A-1) having at least one group selected from the class consisting of a hydroxyl group, a carboxyl group and a sulfonic acid group; and an aromatic amine compound (A-2) not having any of a hydroxyl group, a carboxyl group and a sulfonic acid group.

[(A-1) Aromatic amine compound having at least one group selected from the class consisting of a hydroxyl group, a carboxyl group and a sulfonic acid group]

The compound (A-1) includes, for example, compounds represented by the following formulae (6) to (8).

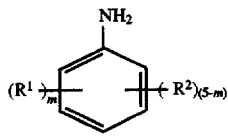

wherein m is an integer of 1 to 5; $R^1$ is at least one selected from the group consisting of —OH, —COOH and —SO$_3$H; $R^2$ is at least one selected from the group consisting of —H, —NH$_2$, —Cl, —NO$_2$, —COCH$_3$, —OCH$_3$, —N(CH$_3$)$_2$ and an alkyl group having 1 to 3 carbon atoms; and when a plurality of $R^1$ are present, they may be the same or different and when a plurality of $R^2$ are present, they may be the same or different.

Specifically, there are exemplified o-, m-, or p-aminophenol, 2-amino-4-chlorophenol, 5-nitro-2-aminophenol, 2-nitro-4-aminophenol, 4-nitro-2-aminophenol, o-, m-, or p-aminobenzoic acid, 2,3-, 2,4-, 2,5-, 2,6-, 3,4-, 3,5- or 4,6-diaminobenzoic acid, 3- or 4-aminophthalic acid, 2-, 4- or 5-aminoisophthalic acid, 4,6-diaminoisophthalic acid, 2,5- or 2,6-diaminoterephthalic acid, 3-, 4- or 5-aminosalicylic acid, 4-oxyanthranylic acid, o-, m-, or p-aminobenzenesulfonic acid, 2,3-, 2,4-, 2,5-, 2,6-, 3,4- or 3,5-diaminobenzenesulfonic acid, 2-amino-1-phenol-4-sulfonic acid, 6-amino-4-nitro-1-phenol-2-sulfonic acid and 6-amino-4-chloro-1-phenol-2-sulfonic acid.

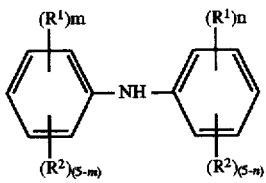

wherein m, $R^1$ and $R^2$ are as defined in the general formula (6); n is an integer of 0 to 5; and when a plurality of $R^1$ are present, they may be the same or different and when a plurality of $R^2$ are present, they may be the same or different.

Specifically, there are exemplified 4-hydroxydiphenylamine, 4-amino-4'-hydroxydiphenylamine, 4-carboxydiphenylamine, 4-amino-4'-carboxydiphenylamine, 4-sulfodiphenylamine and 4-amino-4'-sulfodiphenylamine.

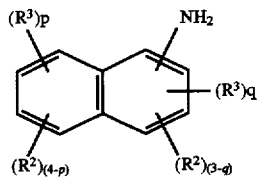

wherein p is an integer of 0 to 4, q is an integer of 0 to 3, provided that p and q are not simultaneously 0; $R^2$ is as defined in the general formula (6); and $R^3$ is at least one selected from the group consisting of —OH, —COOH, —CH$_2$COOH, —CH$_2$CH$_2$COOH and —SO$_3$H; and when a plurality of $R^2$ are present, they may be the same or different, and when a plurality of $R^3$ are present, they may be the same or different.

Specifically, there are exemplified 4-amino-1-naphthol, 1-amino-5-naphthol, 1,2-naphthylenediamine-7-carboxylic acid, 1,5-naphthylenediamine-2-carboxylic acid, 1,5-naphthylenediamine-4-carboxylic acid, 1,6-naphthylenediamine-4-carboxylic acid, 1,8-naphthylenediamine-4-carboxylic acid, 1,2-naphthylenediamine-3-sulfonic acid, 1,2-naphthylenediamine-4-sulfonic acid, 1,2-naphthylenediamine-5-sulfonic acid, 1,2-naphthylenediamine-6-sulfonic acid, 1,2-naphthylenediamine-7-sulfonic acid, 1,3-naphthylenediamine-5-sulfonic acid, 1,3-naphthylenediamine-6-sulfonic acid, 1,4-naphthylenediamine-2-sulfonic acid, 1,4-naphthylenediamine-7-sulfonic acid, 1,5-naphthylenediamine-2-sulfonic acid, 1,5-naphthylenediamine-4-sulfonic acid, 1,5-naphthylenediamine-7-sulfonic acid, 1,6-naphthylenediamine-2-sulfonic acid, 1,6-naphthylenediamine-4-sulfonic acid, 1,8-naphthylenediamine-7-sulfonic acid, 1,8-naphthylenediamine-4-sulfonic acid, naphthylenediamine-3,6-disulfonic acid, 1,8-naphthylenediamine-4,5-disulfonic acid, α-amino-β-naphthalenepropionic acid, α-amino-β-naphthalenecarboxylic acid, 2-naphthylamine-1-sulfonic acid, 8-naphthylamine-1-sulfonic acid, 5-naphthylamine-1-sulfonic acid, 1-amino-2-naphthol-4-sulfonic acid, 2-amino-8-naphthol-6-sulfonic acid (γ acid), 2-amino-5-naphthol-7-sulfonic acid (J acid) and 1-amino-8-naphthol-3,6-disulfonic acid (H acid).

Among the compounds (A-1), preferred are o-, m- or p-aminophenol, 2,4- or 2,5-diaminobenzenesulfonic acid, 2,3-, 2,4-, 2,5-, 3,4- or 3,5-diaminobenzoic acid, 4,6-diaminoisophthalic acid, 2,5- or 2,6-diaminoterephthalic acid, 1,2-naphthylenediamine-7-sulfonic acid, 1,5- or 1,6-naphthylenediamine-4-sulfonic acid and 1,5- or 1,6-naphthylenediamine-4-carboxylic acid.

[(A-2) Aromatic amine compound not having any of a hydroxyl group, a carboxyl group and a sulfonic acid group]

The compounds (A-2) are, for example, compounds represented by the following general formulae (9) to (11).

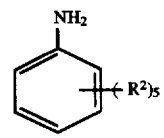

wherein a plurality of $R^2$ may be the same or different and are as defined in the general formula (6).

Specifically, there are exemplified aniline, o-, m-, or p-phenylenediamine, o-, m- or p-chloroaniline, o-, m-, or p-nitroaniline, o-, m- or p-methylaniline, N,N-dimethyl-p-phenylenediamine, 4-chloro-o-phenylenediamine, 4-methoxy-o-phenylenediamine and 2,3-diaminotoluene.

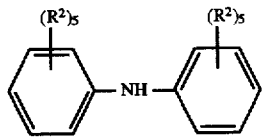

wherein a plurality of $R^2$ may be the same or different and are as defined in the general formula (6).

Specifically, there are exemplified 4-aminodiphenylamine, 2-aminodiphenylamine, 4,4'- diaminodiphenylamine and 4-amino-3'-methoxydiphenylamine.

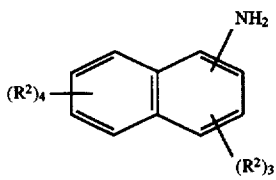

wherein a plurality of $R^2$ may be the same or different and are as defined in the general formula (6).

Specifically, there are exemplified α-naphthylamine, β-naphthylamine, 1,5-diaminonaphthalene, 1,8-diaminonaphthalene and 2,3-diaminonaphthalene. Among the compounds (A-2), preferred are o-, m-, or p-phenylenediamine, 2- or 4-aminodiphenylamine, 4,4'-diaminodiphenylamine and 1,5- or 1,8-diaminonaphthalene.

The aromatic amine compounds (A) can be used singly or in a combination of two or more thereof. As the aromatic amine compounds (A), at least one of said compound (A-1) and said compound (A-2) is used, preferably the compound (A-1) is used, and more preferably the compound (A-1) and the compound (A-2) are used.

The quinone compounds (B) are, for example, compounds represented by the following general formulae (12) to (15).

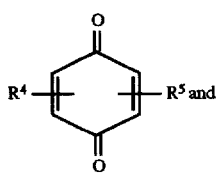

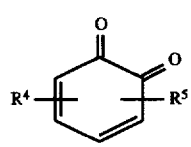

wherein $R^4$ is —H, —$NH_2$, —Cl, —Br, —OH, —$NO_2$, —$COCH_3$, —$OCH_3$, —$N(CH_3)_2$ or an alkyl group having 1 to 3 carbon atoms, and $R^5$ is —H, —$NH_2$, —OH, —$CH_3$, —COOH or —$SO_3H$.

Specifically, there are exemplified o-, m- or p-benzoquinone, oxy-p-benzoquinone, chloro-p-benzoquinone, bromo-p-benzoquinone, duroquinone and chloranil.

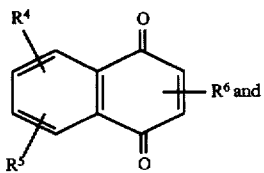

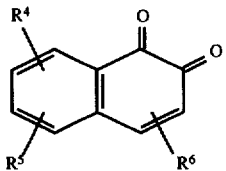

wherein $R^4$ and $R^5$ are as defined in the general formula (12), and $R^6$ represents —H, —OH, —$CH_3$, —Cl, —Br, —$COCH_3$, —$OCH_3$, —COOH or —$SO_3H$.

Specifically, there are exemplified 6-methyl-1,4-naphthoquinone, 2-methyl-1,4-naphthoquinone, lawsone, juglone, plumbagin, α-naphthoquinone and β-naphthoquinone.

Among said quinone compounds, preferred are o- or p-benzoquinone, α- or β-naphthoquinone and lawsone. Said quinone compounds can be used singly or in a combination of two or more thereof.

The condensation product of said aromatic amine compound (A) and said quinone compound (B) is prepared by reacting the component (A) and the component (B) in a suitable medium and, if necessary, in the presence of a catalyst generally at room temperature (for example, 20° C.) to 200° C. for 0.5 to 100 hours, and preferably at room temperature to 150° C. for 3 to 30 hours.

Since the quinone compound (B) acts also as a condensation catalyst, it is not necessary generally to add the other condensation catalysts. The other catalysts usable when using the same include azo compounds such as α,α'-azobisisobutylonitrile, α,α'-azobis-2,4-dimethylvaleronitrile; simple substance halogens in the form of a molecule or element, such as iodine, bromine, chlorine and fluorine; inorganic peroxides such as hydrogen peroxide, sodium peroxide, potassium persulfate and ammonium persulfate; organic peroxides such as peracetic acid, benzoyl peroxide, cumene hydroperoxide, perbenzoic acid and p-menthane hydroperoxide; oxyacids and their salts, such as iodic acid, periodic acid, potassium periodate, sodium perchlorate; metal salts such as ferrous chloride, ferric chloride, copper sulfate and cuprous chloride; and aromatic nitro compounds such as nitrobenzen, o-, m- or p-oxynitrobenzene, o-, m- or p-nitroanisole, o-, m- or p-chloronitrobenzene, o-, m- or p-nitrobenzoic acid and o-, m- or p-nitrobenzenesulfonic acid.

Mediums for effecting said condensation reaction include, for example, alcohols such as methanol, ethanol and propanol; ketones such as acetone and methyl ethyl ketone; and esters such as methyl acetate and ethyl acetate; tetrahydrofuran; dimethylformamide; dimethylacetamide; toluene; and xylene.

The pH of the medium for effecting said condensation reaction is generally in the range of 1 to 13, and pH adjusters can be used without particularly being restricted.

The proportion of the aromatic amine compound (A) to the quinone compound (B) when conducting the condensation reaction is affected by the kind of each of the amine compound, quinone compound and solvent used, reaction temperature, reaction time, etc. Generally, the amount of the quinone compound (B) is preferably 0.01 to 10 parts by weight, and more preferably 0.1 to 5 parts by weight, per part by weight of the aromatic amine compound (A). Whenever the quinone compound (B) is too large or too small, the polymer scale deposition preventive effect of the resulting condensation products lowers.

It is preferable to use (A-1) as the component (A) in order to more enhance the polymer scale deposition preventive effect, as aforementioned, and it is more preferable to use (A-1) and (A-2) together. This is presumably because the use of (A-1) and (A-2) together as the component (A) results in improving the adhesion of the resulting condensation product of the compound (A-1) and the compound (A-2) and the quinone compound (B) to the inner wall surface, etc. of a polymerization vessel when the condensation product was coated onto the inner wall surface, etc. of the polymerization vessel. When using the aromatic amine compounds (A-1) and (A-2) together, the compound (A-2) is used in an amount of preferably 0.01 to 10 parts by weight, and more preferably 0.1 to 5 parts by weight, per part by weight of the compound (A-1).

If the degree of condensation is too high, precipitation of the condensation product may occur when the same product was brought into an alkaline solution as set forth later. For this reason, the coating liquid becomes heterogeneous, thus lowering the polymer scale deposition preventive effect. Accordingly, in order to adjust the condensation degree of the condensation product, it is preferable to add a reaction stopper (C) at a suitable time during the condensation reaction of the component (A) and the component (B). Upon adding the reaction stopper, it becomes possible even to store the condensation product for a long time.

The reaction stoppers (C) include, for example, the following inorganic reducing agents (C-1), aromatic hydroxy compounds (C-2) and aromatic hydroxy compound type condensation products (C-3).

[(C-1) Inorganic reducing agent]

The reducing agents (C-1) are exemplified specifically by hydrides such as hydrogen, hydrogen iodide, hydrogen bromide, hydrogen sulfide, lithium aluminum hydride, sodium boron hydride, calcium boron hydride, zinc boron hydride, tetraalkylammonium boron hydride, trichlorosilane and triethylsilane; lower oxides and lower oxyacid salts, such as carbon monoxide, sulfur dioxide, sodium thiosulfate, sodium thiosulfite, sodium sulfite, potassium sulfite, sodium bisulfite and sodium hydrosulfite; sulfur compounds such as rongalite, sodium sulfide, sodium polysulfide and ammonium sulfide; alkali metals such as sodium and lithium; metals having a large electropositivity or their amalgams, such as magnesium, calcium, aluminum and zinc; salts of metals in the state of a low valency, such as iron (II) sulfate, tin (II) chloride and titanium (III) trichloride; phosphorus compounds such as phosphorus trichloride, phosphorus triiodide, trimethylphosphine, triphenylphosphine, trimethyl phosphite, hexamethylphosphorous triamide; and diborane and substituted boranes, such as hydrazine, diborane, ethane-1,2-diaminoborane, dimethylamine-borane and pyridineborane. Among them, preferred are hydrogen iodide, hydrogen bromide, sodium boron hydride, sulfur dioxide, sodium thiosulfate, sodium thiosulfite, sodium sulfite, potassium sulfite, sodium bisulfite, sodium hydrosulfite and rongalite.

[(C-2) Aromatic hydroxy compound]

The aromatic hydroxy compounds are, for example, compounds represented by the following general formulae (16) to (18).

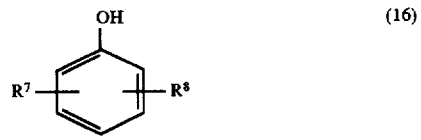

wherein $R^7$ represents —H, —Cl, —OH, —COCH$_3$, —OCH$_3$, —COOH, —SO$_3$H or an alkyl group having 1 to 3 carbon atoms, and $R^8$ represents —H, —Cl, —OH, —OCH$_3$, —OC$_2$H$_5$ or —COOH.

Specifically, there are exemplified phenol, hydroquinone, resorcinol, catechol, hydroxyhydroquinone, pyrogallol, o-, m- or p-chlorophenol, o-, m- or p-hydroxybenzoic acid, 2,4-dihydroxybenzoic acid, 2,5-dihydroxybenzoic acid, 2,6-dihydroxybenzoic acid, 3,4-dihydroxybenzoic acid, 3,5-dihydroxybenzoic acid and 2,5-, 2,6- or 3,5-dihydroxytoluene. Among them, preferred are hydroquinone, resorcinol, catechol, hydroxyhydroquinone, o-,m- or p-hydroxybenzoic acid and pyrogallol.

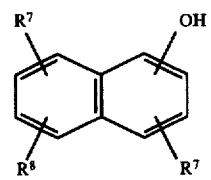

wherein two $R^7$ may be the same or different and are as defined above, and $R^8$ is also as defined above.

Specifically, there are exemplified α-naphthol, β-naphthol, 1,3-, 1,4-, 1,5-, 2,3-, 2,6- or 2,7-dihydroxynaphthalene, 1-hydroxy-2-naphthoic acid and 3-hydroxy-2-naphthoic acid. Among them, preferred are α-naphthol, β-naphthol and 1,3- or 2,7-dihydroxynaphthalene.

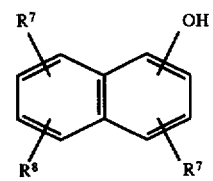

wherein two $R^7$ may be the same or different and are as defined above, and $R^8$ is also as defined above.

Specifically, there are exemplified 2-hydroxybiphenyl, 3-hydroxybiphenyl, 4-hydroxybiphenyl, 2,2'-dihydroxybiphenyl, 5,5'-dihydroxybiphenyl, 4,4'-dihydroxybiphenyl and 3,3',4,4'-tetrahydroxybiphenyl. Among them, preferred are 4,4'-dihydroxybiphenyl and 3,3',4,4'-tetrahydroxybiphenyl.

[(C-3) Aromatic hydroxy compound type condensate]

The aromatic hydroxy compound type condensate is a condensate comprised of an aromatic hydroxy compound as an essential condensation component. The condensate includes a condensate consisting of the aromatic hydroxy compound (C-2), a condensate of the aromatic hydroxy compound (C-2) with the other compound (for example, acetone, aldehydes and aromatic amine compounds), aromatic hydroxyl group-containing natural organic compounds and flavonoid hydroxyl group-containing natural organic compounds.

[(C-3-1) Condensate of an aromatic hydroxy compound alone]

A condensate can be obtained by the condensation reaction of any of the above-exemplified aromatic hydroxy compounds (C-2). Typical examples include a condensate of each of pyrogallol, resorcinol, cathecol, 2,7-dihydroxynaphthalene and 2-hydroxynaphthoquinone. These condensates are obtained by reacting the aromatic hydroxy compound at room temperature (for example, 20° C.) to about 100° C. in the presence of a catalyst in water, an organic solvent, such as alcohols, ketones and esters, or a mixed solvent of water and said organic solvent. The catalysts are exemplified by peroxides, azo compounds, nitro compounds, halogen compounds, quinones and metal salts, and specifically periodic acid, potassium periodate, hydrogen peroxide, α,α'-azobisisobutylonitrile, ferric chloride, nitrobenzene and p-benzoquinone.

[(C-3-2) Aromatic hydroxy compound-acetone condensate]

Any of the condensates of the above-exemplified aromatic hydroxy compounds (C-2) and acetone can be used. Typical examples include pyrogallol-acetone condensate, resorcinol-acetone condensate, 2,7-dihydroxynaphthalene-acetone condensate, 1,5-dihydroxynaphthalene-acetone condensate, 2,6-dihydroxynaphthalene-acetone condensate, 2,3-dihydroxynaphthalene-acetone condensate, 2-hydroxynaphthoquinone-acetone condensate and alizarin-acetone condensate. The above condensates are obtained by dissolving the aromatic hydroxy compound in acetone and reacting the solution at room temperature (for example, 20° C.) to about 100° C. in the presence of a catalyst. The catalyst is exemplified by phosphorus oxychloride.

[(C-3-3) Aromatic hydroxy compound-aldehyde condensate]

The other component, aldehydes, of the condensate includes, for example, formaldehyde, acetaldehyde, glyoxal, glutaraldehyde and benzaldehyde. Any of the condensates of the aromatic hydroxy compounds (C-2) and the aldehydes, as above-exemplified, can be used. Typical examples include a condensate of phenol, hydroquinone, cathecol, pyrogallol, 2,7-dihydroxynaphthalene, 1,5-dihydroxynaphthalene, 2,3-dihydroxynaphthalene, alizarin, anthraflavinic acid or 1,4,5,8-tetrahydroxynaphthalene with formaldehyde; pyrogallol-benzaldehyde condensate; phenol-benzaldehyde condensate; 2,3-dihydroxynaphthalene-benzaldehyde condensate; catechol-benzaldehyde condensate; anthraflavinic acid-benzaldehyde condensate, 2,7-dihydroxynaphthalene-benzaldehyde condensate; 1,4,5,8-tetrahydroxynaphthalene-benzaldehyde condensate; and 1,5-dihydroxynaphthalene-benzaldehyde condensate. The condensates are obtained by reacting the aromatic hydroxy compounds and the aldehydes at room temperature (for example, 20° C.) to about 200° C. in the presence of a catalyst in an aqueous solvent or a alcoholic solvent. The catalysts are exemplified by acidic compounds such as phosphoric acid and hydrochloric acid, and alkaline compounds such as sodium hydroxide, potassium hydroxide and ammonia.

[(C-3-4) Aromatic hydroxy compound-aromatic amine compound condensate]

The other condensation component, aromatic amine compounds, of the condensate includes compounds as already set forth as the component (A) of the polymer scale deposition preventive agent according to the present invention. Combinations of the aromatic hydroxy compounds with the aromatic amine compounds are not particularly restricted. Typical examples include pyrogallol-p-phenylenediamine condensate, resorcinol-m-phenylenediamine condensate, pyrogallol-1,8-diaminonaphthalene condensate, catechol-1,8-diaminonaphthalene condensate, 2,7-dihydroxynaphthalene-p-aminophenol condensate, 4-aminodiphenylamine-pyrogallol condensate and 2,3-dihydroxynaphthalene-1,5-diaminonaphthalene condensate. The condensates are obtained by reacting the aromatic hydroxy compounds and the aromatic amine compounds at room temperature (for example, 20° C.) to about 200° C. in the presence of a catalyst in water, an organic solvent, such as alcohols, ketones and esters, or a mixed solvent of water and said organic solvent. The catalysts are exemplified by peroxides such as periodic acid, potassium periodate and hydrogen peroxide; azo compounds such as α,α'-azobisisobutylonitrile; metal salts such as ferric chloride; aromatic nitro compounds such as nitrobenzene; and aromatic quinone compounds such as p-benzoquinone.

[(C-3-5) Aromatic hydroxyl group-containing natural organic compound]

The aromatic hydroxyl group-containing natural organic compounds are exemplified by Chinese gallotannin, sumac tannin, tara tannin, valonia tannin, chestnut tannin, myrobalan tannin, oak tannin, divi-divi tannin, algarobillatannin, gambier tannin, quebrachotannin, wattle tannin, mimosa tannin, mangrove tannin, hemlock tannin, spruce tannin, Burma cutch tannin, oak bark tannin, tannin of persimmon, curcumin, urushiol, lignin, sodium lignin sulfonate and alkali lignin.

[(C-3-6) Flavonoid hydroxyl group-containing natural organic compound]

The flavonoid hydroxyl group-containing natural organic compounds are specifically exemplified by perilla coloring matter, grape juice coloring matter, grape skin coloring matter, red cabbage coloring matter, corn coloring matter, kaoliang coloring matter, safflower coloring matter and cacao coloring matter.

Among the aromatic hydroxy compound condensates (C-3-1) to (C-3-6), preferred are pyrogallol-acetone condensate, 2,7-dihydroxynaphthalene-acetone condensate, 2,3-dihydroxynaphthalene-acetone condensate, resorcinol-acetone condensate, 2,7-dihydroxynaphthalene-benzaldehyde condensate, 2,3-dihydroxynaphthalene-formaldehyde condensate, 1,4,5,8-tetrahydroxynaphthalene-benzaldehyde condensate, pyrogallol-formaldehyde condensate, 2,7-dihydroxynaphthalene condensate, pyrogallol condensate, 2,7-dihydroxynaphthalene-p-aminophenol condensate, catechol-4-aminodiphenylamine condensate, pyrogallol-1,8-diaminonaphthalene condensate, Chinese gallotannin, wattle tannin, mimosa tannin, oak tannin, hemlock tannin, quebrachotannin, chestnut tannin, tannin of persimmon and mangrove tannin.

The reaction stopper may be added as it is or may be added after dissolving the same in a suitable solvent, for example, a solvent for said condensation reaction. The reaction stopper (C) may be added after starting the condensation reaction of the component (A) and the component (B). Preferably, it is immediately before the condensation product of the component (A) and the component (B) is separated. That is, although it is varied with the kind of each of the components (A) and (B), and reaction rate, there is added when the conversion of the component (A) and the component (B) to condensation reaction reached 50 to 90% by weight. The conversion to condensation reaction is calculated by the following formula.

Conversion to condensation reaction={(a−b)/a}×100

The amount of the reaction stopper (C) added is preferably 0.01 to 10 parts by weight, and more preferably 0.1 to 5 parts by weight, per part by weight of the total amount of the component (A) and the component (B).

12) Reaction products having a molecular weight of 1,000 or more among reaction products of polyvinyl alcohols and aminobenzoic acid, as described in WO 88/05055:

An aminobenzoic acid ester of partially saponified polyvinyl acetate, represented by the formula:

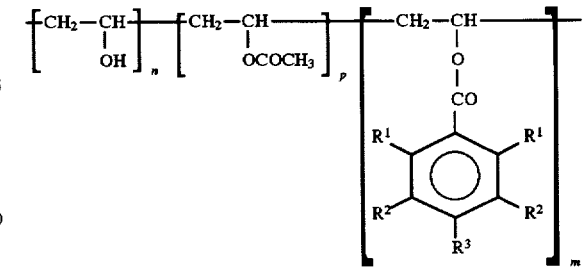

wherein $R^1$, $R^2$ and $R^3$ may be the same or different and are a hydrogen atom, an amino group (—$NH_2$), provided that at least one of these substituents is an amino group; and m, n and p are an integer of m>2, n≧0 and p≧0, respectively.

This ester is obtained in the following manner. First, the partially saponified polyvinyl acetate and an acid halide represented by the formula (i):

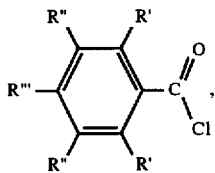

wherein R', R" and R'" may be the same or different and are a hydrogen atom or a nitro group (—NO$_2$), provided that at least one of these substituents is a nitro group, are reacted at room temperature (for example, 20° C.) to 200° C. for 1 to 50 hours in an suitable solvent in the presence of a catalyst to prepare a compound represented by the formula (ii):

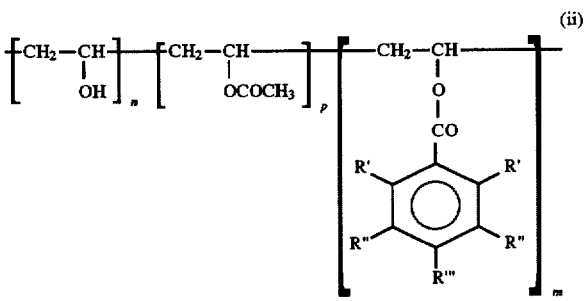

wherein R', R" and R'" are as defined above, and m, n and p are an integer of m>2, n≧0 and p≧0, respectively.

Then, this compound is reduced with triethanolammonium-formic acid in the presence of a palladium catalyst to thereby obtain a desired aminobenzoic acid ester.

Among the conjugated π bond compounds as described above, preferred are a condensate of the aromatic amine compound and the quinone compound; a condensate of the aromatic amine compound and the aromatic nitro compound; and a condensate of the aromatic amine compound, the quinone compound and the aromatic hydroxy compound.

Component (b)

The polymer scale deposition preventive agent according to the present invention contains a polyalkylene oxide as the component (b). The polymer scale preventive agent comprised of the polyalkylene oxide and the aromatic compound having eight or more conjugated π bonds and having a molecular weight of 1,000 or more exhibits a remarkable effect. This is presumably because the polyalkylene oxide associates strongly with the conjugated π bond compound to prevent the elution thereof into the reaction mixture containing a monomer; and also because the polyalkylene oxide has no chemically active group and, therefore, affects slightly on the polymerization system. The monomer, alkylene oxide, includes, for example, ethylene oxide (hereinafter, referred to as EO) and propylene oxide, (hereinafter, referred to as PO). The polyalkylene oxides may be either a homopolymer or copolymer thereof, or a mixture of the homopolymer and the copolymer. Preferable polyalkylene oxides include polyethylene oxide, polypropylene oxide and a copolymer of ethylene oxide with propylene oxide. Incidentally, in a copolymer of EO and PO, or a mixture of polyethylene oxide and polypropylene oxide, a polymer obtained when the ratio of EO is higher becomes hydrophilic, while in contrast thereto, a polymer obtained when the ratio of PO is higher becomes lipophilic.

Accordingly, the ratio of EO to PO may be determined depending upon the kind (aqueous or alcoholic) of a solvent used in the preparation of the polymer scale preventive agent.

The weight-average molecular weight of the component (A) is 2,000 or more, preferably 2,000 to 200,000, and more preferably 3,000 to 100,000. If the molecular weight is less than 2,000, it is feared that the component (a) contained in a coating film consisting of the polymer scale preventive agent is eluted into the reaction mixture containing a monomer during polymerization.

The weight ratio of the component (a) to the component (b) is 100/500 to 100/1, and preferably 100/300 to 100/3. If the ratio is too low, it is feared that the polymer scale preventive agent is eluted into a medium such as water during polymerization. In contrast, if it is too high, precipitation may occur in the preparation of a coating liquid consisting of the polymer scale preventive agent. Thus, the ability of preventing polymer scale can not be sufficiently exhibited.

Component (c)

It is desirable that the polymer scale deposition preventive agent according to the present invention further comprises an inorganic colloid. This results in enhancing the polymer scale deposition preventive effect. The inorganic colloids include, for example, colloids of an oxide or hydroxide of a metal selected from, for example, aluminum, thorium, titanium, zirconium, antimony, tin and iron; colloids of tungstic acid, vanadium pentoxide, gold and silver; silver iodide sol; and colloids of selenium, sulfur and silica. Among them, preferred is colloidal silica. Particularly preferable colloidal silica is aqueous silica sol, methanol silica sol, butanol silica sol and ethylene glycol silica sol.

Methods for preparing inorganic colloids are not particularly limited. For example, there may be used particulate colloids prepared by a dispersion method using water as a dispersion medium or by a aggregation method. The size of the colloidal particle is preferably 1 to 500 nm, and more preferably 1 to 100 nm.

The compounding amount of the inorganic colloid is preferably 50/1 to 1/50, and more preferably 10/1 to 1/10, in terms of the weight ratio of the inorganic colloid (as a solid matter)/[the component (a)+the component (b)]. Even if the amount of the inorganic colloid is too large or too small, advantages caused by using together may be decreased.

(Process for producing polymers using the polymer scale preventive agent)

The process for producing a polymer according to the present invention is a process for obtaining a polymer by polymerizing a monomer having an ethylenically unsaturated double bond in a polymerization vessel having coating films consisting of the polymer scale deposition preventive agent at the inner wall surface, and the like, of the polymerization vessel.

Preparation of a Coating Liquid

The polymer scale deposition preventive agent is used to form a coating film at primarily the inner wall surface of a polymerization vessel and besides areas with which a monomer is brought into contact during polymerization. Accordingly, it is used in the form of a coating liquid. The coating liquid is prepared by dissolving or dispersing the component (a) and the component (b) and optionally the inorganic colloid, as mentioned above, at the respective concentrations suitable for them in a solvent to mix them.

The solvents for use in the preparation of the polymer scale deposition preventive agent include, for example, water; alcohol solvents such as methanol, ethanol, propanol, butanol, 2-butanol, 2-methyl-1-propanol, 2-methylpropanol, 3-methyl-1-butanol, 2-methyl-2-butanol and 2-pentanol; ketone solvents such as acetone, methyl ethyl ketone and methyl isobutyl ketone; ester solvents such as methyl formate, ethyl formate, methyl acetate, ethyl acetate and methyl acetoacetate; ether solvents such as 4-methyldioxolane and ethylene glycol diethyl ether; furans; and aprotic solvents such as dimethylformamide, dimethyl sulfoxide and acetonitrile. These may be used singly or as a mixed solvent of two or more thereof.

Among the above solvents, preferred are water and a mixed solvent of water and an organic solvent miscible with water. The organic solvents miscible with water among the organic solvents as mentioned above include alcohol solvents such as methanol, ethanol and propanol; ketone solvents such as acetone and methyl ethyl ketone; and ester solvents such as methyl acetate and ethyl acetate; and among them, preferably alcohol solvents.

The total concentration of the component (a) and the component (b) in the coating liquid is not particularly limited as long as a coated amount after drying, as mentioned later, is obtained, and may be generally 0.001 to 10% by weight, and preferably 0.01 to 2% by weight. If the total concentration is too low, it becomes difficult to obtain a coated amount desirable at the inner wall surface of a polymerization vessel. If the total concentration is unnecessarily high, it becomes economically disadvantageous and further, when it goes to extremes, the formation of a uniform coating film will be hindered. In case where the inorganic colloid is added, the concentration thereof is preferably 0.01 to 5% by weight. Incidentally, a method for adding the inorganic colloid to the components (a) and (b) comprises dissolving or dispersing the components (a) and (b) in said solvent, and thereafter admixing, to the solution or dispersion, the inorganic colloid, which has been previously adjusted to have a concentration of 1 to 10% by weight, with water, an organic solvent used in the coating liquid, a dispersion medium for the inorganic colloid (as a solid matter) or the like.

Formation of a Coating Film

In order to form a coating film on the inner wall surface of a polymerization vessel using the above coating liquid, the coating liquid is first coated on the inner wall surface of the polymerization vessel and then the surface coated is sufficiently dried, for example, at a temperature ranging from room temperature (for example, 30° C. to 100° C., followed by washing with water, if necessary.

Said coating liquid is preferably coated on not only the inner wall surface of a polymerization vessel but also the other areas with which a monomer is brought into contact. For example, there can be enumerated stirring blades, stirring shaft, baffles, condensers, headers, search coil, bolts, nuts, etc. More preferably, it is advisable to coat said coating liquid on areas with which the monomer is not brought into contact during polymerization but on which polymer scale may be deposited, for example, the inner surfaces, etc., of equipments and pipes of an unreacted monomer discovery system, in order to form a coating film. Specifically, such areas include the inner surfaces of monomer distillation columns, condensers, monomer stock tanks and valves. Thus, when forming coating films on areas, with which a monomer is brought into contact during polymerization, and the other areas on which polymer scale may be deposited, polymer scale is prevented from being deposited on these areas.

Incidentally, methods for coating a coating liquid on the inner wall surface of a polymerization vessel are not particularly limited, and there can be used, for example, brush coating, spray coating, a method which involves filling the polymerization vessel with the coating liquid and thereafter withdrawing the same liquid, and besides methods for coating automatically as described in Japanese Pre-examination Patent Publication (Kokai) Nos. 57-61001 and 55-36288, Japanese Patent Publication (Kokoku) Nos. 56-501116 and 56-501117, and Japanese Pre-examination Patent Publication (Kokai) No. 59-11303.

Further, methods for drying wet surfaces provided by coating the coating liquid are also not limited, and there can be used, for example, the following methods: a method in which, after the coating liquid is coated, a hot air having a suitably elevated temperature is blown onto the coated surface; a method in which the inner wall surface and the other surfaces to coat the coating liquid are previously heated, for example, to 30° to 80° C., and the coating liquid is coated directly on the heated surfaces. After drying, the coated surfaces are, if necessary, washed with water. The weight of the thus obtained coating film after drying may be generally 0.001 to 5 g/m$^2$, and preferably 0.01 to 3 g/m$^2$.

The above coating operation may be carried out with every one to several polymerization batches. The formed coating film has a high durability and retains an action for preventing polymer scale deposition. Therefore, the coating operation is required not always to carry out with every polymerization batch. Accordingly, productivity is improved.

Polymerization

The process of the present invention is applied to the polymerization of a monomer having an ethylenically unsaturated bond. Examples of the monomer include vinyl halides such as vinyl chloride; vinyl esters such as vinyl acetate and vinyl propionate; acrylic acid, methacrylic acid and their esters or salts; maleic acid, fumaric acid and their esters or anhydrides; diene monomers such as butadiene, chloroprene and isoprene; styrene; acrylonitrile; vinylidene halides; and vinyl ether. Examples particularly suitable for practicing the process of the present invention include the production of polymers of vinyl halides, such as vinyl chloride, vinylidene halides, or a monomeric mixture comprised primarily of them by suspension polymerization or emulsion polymerization in an aqueous medium. The coating film formed by the process of the present invention has a high durability even for monomers, such as α-methylstyrene, acrylic acid ester, acrylonitrile and vinyl acetate, which have a high solvency power for the conventional coating film, so that the process can be carried out suitably even for the production of polymer beads and latex comprised of polystyrene, polymethacrylate, polyacrylonitrile, etc.; the production of synthetic rubbers such as SBR, NBR, CR, IR, IIR, etc.(these synthetic rubbers are generally produced by emulsion polymerization); and the production of ABS resin.

In the polymerization of one or more of these monomers, an object of preventing scale can be effectively accomplished irrespective of polymerization types, such as suspension polymerization, emulsion polymerization, bulk polymerization and solution polymerization, even in the presence of any of additives such as emulsifiers, stabilizers, lubricants, plasticizers, pH adjusters and chain transfer agents. For example, in the case of suspension polymerization or emulsion polymerization of a vinyl monomer, deposition of scale is effectively prevented even in a polymerization system in which additives added to the polymerization system are suspending agents such as partially saponified polyvinyl alcohol and methyl cellulose; anionic emulsifiers such as sodium lauryl sulfate, sodium dodecylbenzenesulfonate and sodium dioctylsulfosuccinate; nonionic emulsifiers such as sorbitan monolaurate and polyoxyethylene alkyl ether; stabilizers such as tribasic lead sulfate, calcium stearate, dibutyltin dilaurate and dioctyltin mercaptide; lubricants such as rice wax and stearic acid; plasticizers such as DOP and DBP; chain transfer agents such as trichloroethane and mercaptans; and pH adjusters.

The feature of the present invention lies in that a remarkable polymer scale deposition preventive effect is exhibited without being affected by the kind of polymerization catalysts even when using any of the catalysts. Specifically, there are exemplified t-butyl peroxyneodecanoate, bis(2-ethylhexyl)peroxydicarbonate, 3,5,5-trimethylhexanoyl peroxide, α-cumyl peroxyneodecanoate, cumene hydroperoxide, cyclohexanone peroxide, t-butyl peroxypivarate, bis(2-ethoxyethyl)peroxydicarbonate, benzoyl peroxide, diisopropylbenzene hydroperoxide, lauroyl peroxide, 2,4-dichlorobenzoyl peroxide, diisopropyl peroxydicarbonate, α,α'-azobisisobutylonitrile, α,α'-azobis-2,4-dimethylvaleronitrile, di-2-ethylhexyl diperoxyisophthalate, potassium persulfate and ammonium persulfate.

In the following, taking the cases of suspension polymerization and emulsion polymerization as examples, general procedures polymerization will be described.

First, water and a dispersant are charged into a polymerization vessel. Subsequently, the polymerization vessel is evacuated to reduce the initial pressure to a value of 0.1 to 760 mmHg (0.01 to 101 kPa), and a monomer is then charged, whereupon the initial pressure takes usually a value of 0.5 to 30 kgf/cm$^2$·G (150 to 3,040 kPa). Thereafter, polymerization is carried out at a reaction temperature of 30° to 150° C. During the polymerization, one or more selected from water, a dispersant and a polymerization initiator are, if necessary, added. Reaction temperature during the polymerization is different depending on the kind of a monomer to be polymerized. For example, in the case of polymerizing vinyl chloride, polymerization is carried out at 30° to 80° C., while in the case of polymerizing styrene, polymerization is carried out at 50° to 150° C. The polymerization may be judged to be completed when the pressure inside the polymerization vessel has dropped to a value of 0 to 7 kgf/cm$^2$·G (100 to 790 kPa) or when there has been observed substantially no difference between the inlet temperature and outlet temperature of a cooling water flowing into and out of a jacket provided circumferentially of the polymerization vessel (i.e., when liberation of heat due to the polymerization reaction has subsided). The amounts of the water, dispersant and polymerization initiator are generally 20 to 500 parts by weight, 0.01 to 30 parts by weight, and 0.01 to 5 parts by weight, respectively, per 100 parts by weight of the monomer.

In solution polymerization, an organic solvent, such as toluene, xylene and pyridine, is used as the polymerization medium, in place of water. If necessary, a dispersant may be used. The other conditions for polymerization are generally the same as those described for suspension polymerization and emulsion polymerization.

In bulk polymerization, after a polymerization vessel is evacuated to a pressure of about 0.01 to 760 mmHg (0.001 to 101 kPa), a monomer and a polymerization initiator are charged into the polymerization vessel, and then polymerization is carried out at a reaction temperature of −10° to 250° C. For example, the reaction temperature is 30 to 80° C. for the polymerization of vinyl chloride, and is 50° to 150° C. for the polymerization of styrene.

In addition to being used for the formation of a coating film on the inner wall surface, etc., of the polymerization vessel, the polymer scale deposition preventive agent of the present invention may be added directly to the polymerization system, whereby a scale preventive effect can be also more enhanced. In that case, the amount of the polymer scale deposition preventive agent added is suitably about 10 to 1,000 ppm based on the total weight of the monomer or monomers charged into the polymerization vessel. At the time of adding, care should be taken not to adversely affect the fish eyes, bulk specific gravity, particle size distribution or the other qualities of the resulting polymer product.

EXAMPLES

The present invention will now be described in detail with reference to working examples thereof and comparative examples. Incidentally, all parts mean parts by weight.

Production of Condensation Products

In the following Production Examples, the molecular weight of each of the resulting condensation products was measured in accordance with the following manner.

Measurement of Molecular Weight

The weight-average molecular weight in terms of polystyrene is measured by gel permeation chromatography (GPC) under the measuring conditions below.

Column: Guard column

Tradename: Slim-pack GPC-800DP (manufactured by Shimadzu Corp.)

Separate column: Tradename: Slim-pack GPC-803D, 802D (manufactured by Shimadzu Corp.)

Mobile phase: 10 mM LiBr/DMF Flow rate: 1.0 ml/min Detector: RI temperature: 60° C.

The condensation products obtained by the following Production Examples were used as the component (a) in Examples.

Production Example 1

(Production of Condensation Product No. 1)

Into a pressure-resistant reaction vessel, 30,000 moles (960 kg) of methanol, 100 moles (15.8 kg) of 1,8-diaminonaphthalene, 50 moles (5.4 kg) of p-benzoquinone and 250 moles (31.5 kg) of pyrogallol were charged, and the temperature of the resulting mixture was raised to 80° C. with stirring. After reacting at 80° C. for 5 hours, the mixture was cooled to obtain a methanol solution of a condensation product. Thus, a solution of condensation product No. 1 was obtained. The weight-average molecular weight of condensation product No. 1 was 2,000.

Production Example 2

(Production of Condensation Product No. 2)

A polymer scale deposition preventive agent was produced with reference to Production Example 3 described in Japanese Patent Publication (Kokoku) No. 6-62709. Into a pressure-resistant reaction vessel, 30 moles (5.59 kg) of 2,2'-dihydroxybiphenyl, 22.5 moles (0.711 kg) of p-formaldehyde (purity: 95%), 0.19 kg of p-toluenesulfonic acid and 10 L of ethylene glycol dimethyl ether were charged, and the temperature of the resulting mixture was raised to 130° C. with stirring. After reacting at 130° C. for 17 hours, the mixture was poured into 50 L of water. A resin separated by pouring into water was filtered and washed with water, followed by drying to obtain 5.1 kg of 2,2'-dihydroxybiphenyl-formaldehyde condensation resin (condensation product No. 2). The weight-average molecular weight of condensation product No. 2 was 4,300.

Production Example 3

(Production of Condensation Product No. 3)

A polymer scale deposition preventive agent was produced with reference to Production Example 1 described in Japanese Pre-examination Patent Publication (Kokai) No. 57-164107. Into a pressure-resistant reaction vessel, 250 moles (36.0 kg) of 1-naphthol and 180 L of a 1N—NaOH aqueous solution, which contains 180 moles (7.2 kg) of NaOH, were charged, and the temperature of the resulting mixture was raised to 70° C. with stirring. Subsequently, 19.75 L (250 moles) of a formaldehyde aqueous solution, which contains formaldehyde in an amount of 38 w/v %, was dropwise added to the reaction mixture over 1.5 hours. Meanwhile, the temperature inside the reaction vessel was controlled so as not to be more than 80° C. Then, the reaction mixture was cooled to 60° C. over 3 hours with stirring. Further, the temperature of the reaction mixture was raised to 98° C., and the same mixture was reacted at 98° C. for 0.5 hour. Thereafter, the reaction mixture was cooled to obtain an alkaline solution of a condensation product (condensation product No. 3). The weight-average molecular weight of condensation product No. 3 was 1,500.

Production Example 4

(Production of Condensation Product No. 4)

A polymer scale deposition preventive agent was produced with reference to Synthesis 2 of coating compounds described in Japanese Pre-examination Patent Publication (Kokai) No. 57-192413. Into a pressure-resistant reaction vessel, 100 moles (12.6 kg) of pyrogallol and 100 L of water were charged to dissolve the pyrogallol in the water. Then, 200 moles (21.2 kg) of benzaldehyde and 300 moles (29.4 kg) of phosphoric acid were added to the resulting solution, and upon reacting their mixture at 100° C. for 6 hours, a reddish brown product insoluble in water was obtained. After the water-insoluble product was washed with ether, a methanol-soluble ingredient was extracted with methanol from the water-insoluble product. Then, the methanol was removed from the extracted liquid by drying to obtain condensation product No. 4 (pyrogallol-benzaldehyde condensate) as the residue. The weight-average molecular weight was 4,000.

Production Example 5

(Production of Condensation Product No. 5)

A polymer scale deposition preventive agent was produced with reference to Production Example I described in Japanese Patent Publication (Kokoku) No. 59-16561. Into a pressure-resistant reaction vessel, 100 moles (10.8 kg) of m-phenylenediamine, 200 moles (22.0 kg) of resorcinol and 1.04 kg (10 moles as HCl) of 35% HCl were charged, and the temperature of the resulting mixture was raised to 305° C. Immediately when the temperature of the mixture in the reaction vessel has reached 305° C., the mixture was cooled. Water vapor produced in the course of the raising of temperature and the reaction was removed, and the inner pressure was maintained at 150 kPa or less. After cooling, the resulting m-phenylenediamine-resorcinol condensate was ground to obtain condensation product No. 5. The weight-average molecular weight was 3,000.

Production Example 6

(Production of Condensation Product No. 6)

A polymer scale preventive agent was produced with reference to Production Example VI described in Japanese Patent Publication (Kokoku) No. 59-16561. Into a pressure-resistant reaction vessel, 100 moles (10.9 kg) of p-aminophenol and 0.99 kg (9.5 moles as HCl) of 30% HCl were charged, and the temperature of the resulting mixture was raised to 169° C. Upon reaching 169° C., 18 L of xylene was slowly added. The purpose of adding xylene is to remove, as an azeotropic mixture, water producing during the condensation reaction. Then, the temperature of the reaction mixture was raised to 222° C., and the mixture was reacted at 222° C. for 3 hours. A mixed vapor of xylene and water generating during reaction was removed, and the inner pressure was maintained at 150 kPa or less. After three hours' reaction, the reaction mixture was cooled. The resulting reaction product was solid. Subsequently, after the reaction product was ground in the form of fine particles, the product was washed with water, filtered, and dried to obtain condensation product No. 6. The weight-average molecular weight was 2,500.

Production Example 7

(Production of condensation product No. 7)

A polymer scale deposition preventive agent was produced with reference to Example 1 described in Japanese Pre-examination Patent Publication (Kokai) No. 54-7487. Into a reaction vessel, 200 moles (22.0 kg) of resorcinol was charged and heated in a nitrogen atmosphere. The temperature of the resorcinol was raised to 300° C., and the resorcinol was reacted at 300° C. for 8 hours, followed by cooling. The resulting solid self-condensate of resorcinol was ground to obtain condensation product No. 7. The weight-average molecular weight was 1,700.

Preparation of Coating Liquids

One [component (a)] of condensation product Nos. 1 to 7 and a polyalkylene oxide [component (D)], which were listed in Table 1, each were dissolved or dispersed in a solvent listed in the same table. Incidentally, in coating liquid No. 1* a coating liquid was prepared without using the component (a), and in coating liquid No. 2* a coating liquid was prepared without using the component (b). Then, the component (a) and the component (b) were mixed such that the weight ratio thereof was as listed in the same table. Further, an inorganic colloid [(component (c)] was prepared in a concentration listed in Table 1 and was added such that the mixing ratio (as a solid matter) thereof was as listed in the same table. Thus, coating liquid Nos. 1* to 5* and coating liquid Nos. 6 to 19 were prepared. Incidentally, the coating liquids bearing a No. marked with * are coating liquids, which were used in Comparative Examples as mentioned later, incapable of meeting the requirements of the present invention.

TABLE 1

| Coating liquid No. | Component (a) | Component (b) EO:PO | Component (b) Molecular weight | (a)/(b) weight ratio | Component (c) Silica sol[1] | Component (c) (weight ratio %) | [(a) + (b)]/(c) (weight ratio) | Solvent Composition | Solvent Volume ratio | Concentration (weight ratio %) |
|---|---|---|---|---|---|---|---|---|---|---|
| 1* | — | 100:0 | 3000 | 0/100 | — | — | — | Water/MeOH | 50/50 | 0.5 |
| 2* | 1 | — | — | 100/0 | — | — | — | Water/MeOH | 50/50 | 0.5 |
| 3* | 1 | 100:0 | 3000 | 4/100 | — | — | — | Water/MeOH | 50/50 | 0.5 |
| 4* | 1 | 100:0 | 3000 | 100/2 | — | — | — | Water/MeoH | 50/50 | 0.5 |
| 5* | 1 | 100:0 | 1200 | 100/100 | — | — | — | Water/MeOH | 50/50 | 0.5 |
| 6 | 1 | 100:0 | 3000 | 100/100 | — | — | — | Water/MeoH | 50/50 | 0.5 |
| 7 | 2 | 10:90 | 8200 | 100/50 | — | — | — | Water/MeoH | 20/80 | 0.5 |
| 8 | 3 | 40:60 | 2300 | 100/200 | — | — | — | Water/MeOH | 30/70 | 0.5 |
| 9 | 4 | 40:60 | 2300 | 100/200 | — | — | — | Water/MeOH | 30/70 | 0.5 |
| 10 | 5 | 100:0 | 20000 | 100/50 | — | — | — | Water/MeOH | 70/30 | 0.5 |
| 11 | 6 | 100:0 | 60000 | 100/30 | — | ' | — | Water/MeOH | 70/30 | 0.5 |
| 12 | 7 | 70:30 | 6000 | 100/100 | — | — | — | Water/MeOH | 50/50 | 0.5 |
| 13 | 1 | 10:90 | 8200 | 100/50 | Methanol | 20 | 100/200 | MeOH | — | 0.6 |
| 14 | 2 | 0:100 | 6200 | 100/50 | Methanol | 20 | 100/200 | MeOH | — | 0.6 |
| 15 | 3 | 100:0 | 20000 | 100/10 | Aqueous | 15 | 100/300 | Water/MeOH | 80/20 | 0.45 |
| 16 | 4 | 70:30 | 6000 | 100/50 | Aqueous | 15 | 100/300 | Water/MeOH | 50/50 | 0.6 |
| 17 | 5 | 20:80 | 4000 | 100/50 | EG | 20 | 100/150 | Water/MeOH | 10/90 | 0.5 |
| 18 | 6 | 40:60 | 2300 | 100/200 | Aqueous | 15 | 100/200 | Water/MeOH | 20/80 | 0.6 |
| 19 | 7 | 70:30 | 6000 | 100/100 | Aqueous | 15 | 100/200 | Water/MeOH | 50/50 | 0.6 |

Note:
1) "methanol", "aqueous", and "EG" stand for methanolic silica sol, aqueous silica sol, and ethylene glycolic silica sol, respectively.

Example 1

In each experiment, a coating liquid listed in Table 2 was coated on the inner wall of a polymerization vessel having a inner capacity of 1,000 L made of stainless steel and equipped with a stirrer, the stirrer and the other areas with which a monomer was brought into contact, heated at 50° C. for 15 minutes, dried, and washed with water to form a coating film. However, in experiment No. 101* which was a comparative example, the treatment of forming a coating film was not conducted.

Into the polymerization vessel in which the coating film was formed as mentioned above, 420 kg of water, 320 g of a partially saponified polyvinyl alcohol having a saponification degree of 90 mole %, 180 kg of styrene and 1.7 kg of benzoyl peroxide were charged and subjected to polymerization at an inner temperature of 80° C. for 8 hours while stirring. After the polymerization was over, the amount (g/cm$^2$) of polymer scale deposited was measured in accordance with the following method. The results are shown in Table 2. Incidentally, the experiments bearing a No. marked with * are comparative examples incapable of meeting the requirements of the present invention.

Method for Measuring the Amount of Polymer Scale Deposited

The polymer scale deposited in an area of 10 cm square is scraped off with a spatula made of a stainless steel as completely as can be confirmed with the naked eye, and then the scraped scale is weighed. The measured value is multiplied by 100 to obtain the amount of the deposited polymer scale per area of 1 m$^2$.

TABLE 2

| Experiment No. | Coating liquid No. | Amount of scale deposited (g/cm$^2$) |
|---|---|---|
| 101* | — | 920 |
| 102* | 1* | 750 |
| 103* | 2* | 58 |
| 104* | 3* | 170 |
| 105* | 4* | 50 |
| 106* | 5* | 36 |
| 107 | 6 | 5 |
| 108 | 7 | 7 |
| 109 | 9 | 8 |
| 110 | 11 | 6 |
| 111 | 14 | 0 |
| 112 | 16 | 1 |
| 113 | 18 | 0 |

Example 2

In each experiment, a coating film was formed using the same polymerization vessel and operation as in Example 1, except that a coating liquid listed in Table 3 was used. However, in experiment No. 201* which was a comparative example, the treatment of forming a coating film was not conducted. Into the polymerization vessel, 210 kg of water and the inside of the vessel was replaced with nitrogen. Then, a rise in temperature was started such that the inner temperature of the polymerization vessel was 75° C. When the inner temperature reached 65° C. during the rise in temperature, 700 g of sodium lauryl diphenyl ether disulfonate, 8 kg of styrene, 5.3 kg of butyl acrylate and 4 kg of water were added. Further, when the inner temperature reached 75° C., a mixture consisting of 120 g of potassium persulfate, 120 g of sodium hydrogensulfite and 6 kg of water were added. Thereafter, when an exothermic peak was passed, 12.5 kg of sodium lauryl diphenyl ether disulfonate, 480 g of potassium persulfate, 480 g of sodium hydrogensulfite, 152 kg of styrene, 100 kg of butyl acrylate and 100 kg of water was added over 3 hours. After the addition was over, the mixture was further left to stand for 1 hour. After polymerization was completed, the inside of the polymerization vessel was washed with water, and the amount (g/m$^2$) of the deposited polymer scale was measured in the same procedure as in Example 1. The results are shown in Table 3.

TABLE 3

| Experiment No. | Coating liquid No. | Amount of scale deposited (g/cm$^2$) |
| --- | --- | --- |
| 201* | — | 1,300 |
| 202* | 2* | 420 |
| 203* | 5* | 120 |
| 204 | 6 | 15 |
| 205 | 8 | 19 |
| 206 | 10 | 10 |
| 207 | 12 | 22 |
| 208 | 13 | 7 |
| 209 | 15 | 4 |
| 210 | 17 | 2 |
| 211 | 19 | 6 |

Example 3

In each experiment, a coating film was formed using the same polymerization vessel and operation as in Example 1, except that a coating liquid listed in Table 4 was used. However, in experiment No. 301* which was a comparative example, the treatment of forming a coating film was not conducted. Into the polymerization vessel, 400 kg of water, 200 kg of vinyl chloride monomer, 250 g of a partially saponified polyvinyl alcohol having a saponification degree of 80 mole % 25 g of hydroxypropylmethyl cellulose and 75 g of diisopropyl peroxydicarbonate were charged, and the resulting mixture was subjected to polymerization at 57° C. for 6 hours with stirring. After the polymerization was completed, the mixture was washed with water. As this operation being 1 batch, the polymerization batch was continuously repeated 50 times without the treatment of forming a coating film, provided that in experiment Nos. 301 and 302, the polymerization batch was only 1 time. After the polymerization was over, the inside of the polymerization vessel was washed with water and the amount (g/cm$^2$) of the deposited polymer scale was measured in the same procedure as in Example 1. The results are shown in Table 4.

TABLE 4

| Experiment No. | Coating liquid No. | Amount of scale deposited after 50 batches (g/cm$^2$) |
| --- | --- | --- |
| 301* | — | 1,300[a] |
| 302* | 1* | 850[b] |
| 303* | 2* | 45 |
| 304* | 3* | 55 |
| 305* | 4* | 40 |
| 306* | 5* | 37 |
| 307 | 6 | 0 |
| 308 | 7 | 1 |
| 309 | 8 | 1 |
| 310 | 9 | 1 |
| 311 | 10 | 0 |
| 312 | 11 | 0 |
| 313 | 12 | 1 |

[a],[b]: Amount of scale deposited after the end of 1 batch

What is claimed is:

1. A process for producing a polymer comprising the step of polymerizing a monomer having an ethylenically unsaturated double bond in a polymerization vessel having a coating film on the inner wall surface thereof, wherein said coating film consists of the polymer scale deposition preventive agent comprising (a) an aromatic compound having at least eight conjugated π bonds and having a molecular weight of 1,000 or more, and (b) a polyalkylene oxide having a weight-average molecular weight of 2,000 or more, the weight ratio of the component (a) to the component (b) being 100/500 to 100/1.

2. The process according to claim 1, wherein said monomer having an ethylenically unsaturated bond is at least one compound selected from the group consisting of vinyl halides; vinyl esters; acrylic acid, methacrylic acid and their esters and salts; maleic acid, fumaric acid and their esters and anhydrides; diene monomers; styrene; acrylonitrile; vinylidene halides; and vinyl ether.

3. A process for producing a polymer comprising the step of polymerizing a monomer having an ethylenically unsaturated double bond in a polymerization vessel having a coating film on the inner wall surface thereof, wherein said coating film consists of the polymer scale deposition preventive agent of claim 1, further comprising an inorganic colloid.

4. The process according to claim 3, wherein said monomer having an ethylenically unsaturated bond is at least one compound selected from the group consisting of vinyl halides; vinyl esters; acrylic acid, methacrylic acid and their esters and salts; maleic acid, fumaric acid and their esters and anhydrides; diene monomers; styrene; acrylonitrile; vinylidene halides; and vinyl ether.

5. The process according to claim 1, wherein said aromatic compound is selected from the group consisting of reaction products obtained by subjecting dihydroxybiphenyls and aldehydes to a condensation reaction in the presence of an acid catalyst, condensation products obtained by subjecting 1-naphthols and formaldehyde to a condensation reaction in the presence of a catalyst, condensates of phenol compounds and formaldehyde, condensates of phenol compounds and benzaldehyde, polyaromatic amines, reaction products of ketone resins and phenolic compounds, reaction products of ketone resins, phenolic compounds and aldehyde compounds, condensates of phenothiazine and formaldehyde, at least one self-condensation product of a polyhydric phenol, at least one self-condensation product of a polyhydric naphthol, condensates of aromatic amines and aromatic nitro compounds or basified products thereof, condensates of pyrogallol and acetone, condensates of aromatic amine compounds, quinone compounds and aromatic hydroxy compounds, condensates of aromatic amine compounds having at least one functionality selected from the group consisting of a hydroxyl group, a carboxyl group and a sulfonic acid group, with quinone compounds; condensates of aromatic amine compounds free of a hydroxyl group, a carboxyl group or a sulfonic acid group, with quinone compounds, and reaction products of polyvinyl alcohols and aminobenzoic acid.

6. The process according to claim 1, wherein the weight-average molecular weight of said component (b) is 2,000 to 200,000.

7. The process according to claim 1, wherein the weight ratio of said component (a) to said component (b) is 100/300 to 100/3.

8. The process according to claim 1, wherein the molecular weight of said component (a) is 1,500 or more.

9. The process according to claim 1, wherein the aromatic compound of the component (a) is one having at least five π bonds, which are in conjugated relation, in a row.

10. The process according to claim 1, wherein the polyalkylene oxide of the component (b) is at least one compound selected from the group consisting of polyethylene oxide, polypropylene oxide and a copolymer of ethylene oxide with propylene oxide.

11. The process according to claim 1, further comprising an inorganic colloid.

12. The process according to claim 11, wherein said inorganic colloid is at least one colloid selected from the group consisting of colloids of an oxide and hydroxide of aluminum, colloids of an oxide and hydroxide of thorium, colloids of an oxide and hydroxide of titanium, colloids of an oxide and hydroxide of zirconium, colloids of an oxide and hydroxide of antimony, colloids of an oxide and hydroxide of tin, colloids of an oxide and hydroxide of iron, tungstic acid colloids, vanadium pentoxide colloid, gold colloid, silver colloid, silver iodide sol colloid, selenium colloid, sulfur colloid and silica colloid.

13. The process according to claim 11, wherein the particle size of said inorganic colloid is 1 to 500 nm.

14. The process according to claim 11, wherein the amount of said inorganic colloid is 50/1 to 1/50 in terms of the weight ratio of the inorganic colloid divided by the combination of components (a) and (b).

* * * * *